No. 676,175. Patented June 11, 1901.
D. Z. CLAY.
FERTILIZER GRINDER AND SEPARATOR.
(Application filed Aug. 9, 1898.)
(No Model.) 3 Sheets—Sheet 1.
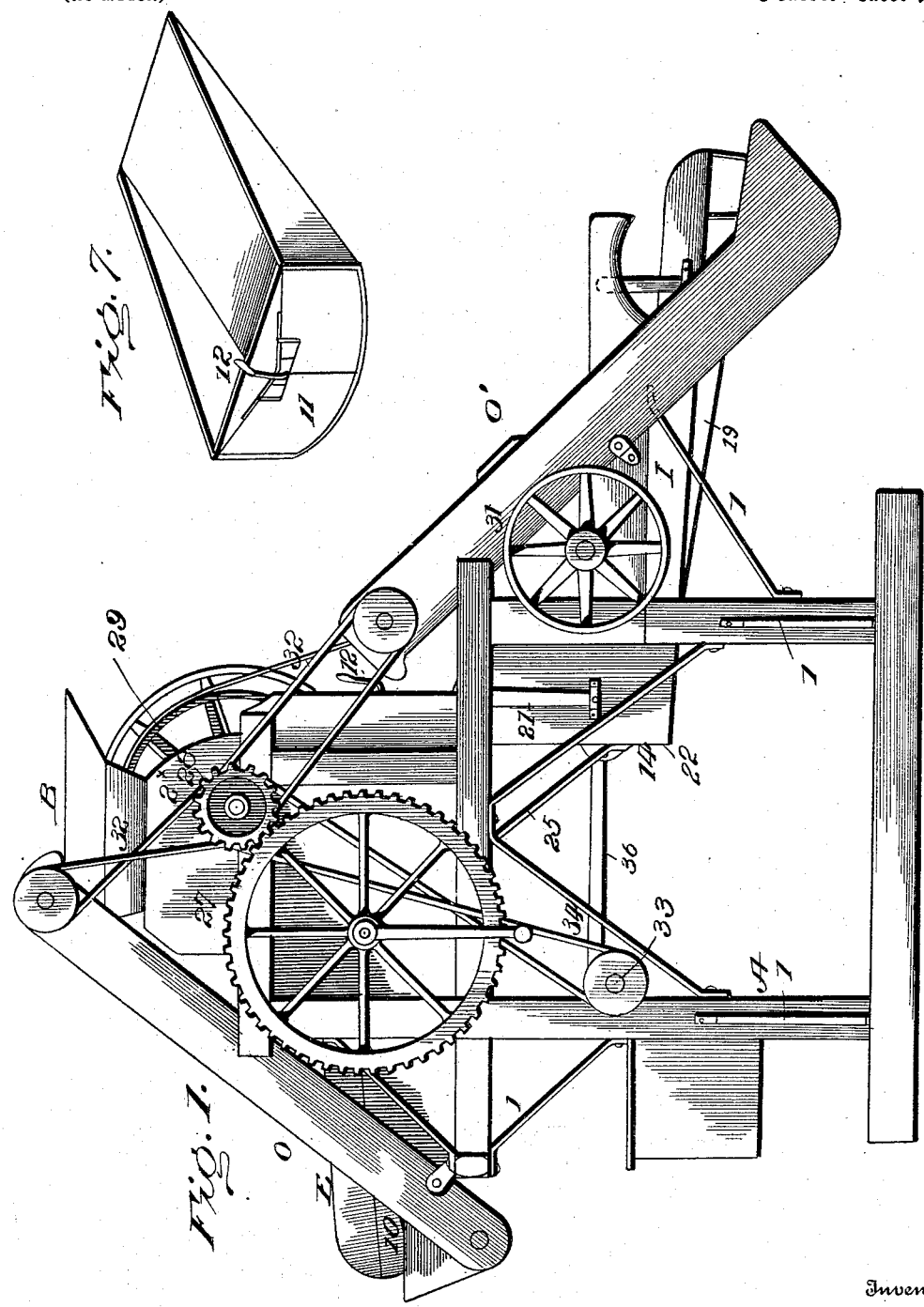

No. 676,175. Patented June 11, 1901.
D. Z. CLAY.
FERTILIZER GRINDER AND SEPARATOR.
(Application filed Aug. 9, 1898.)
(No Model.) 3 Sheets—Sheet 2.
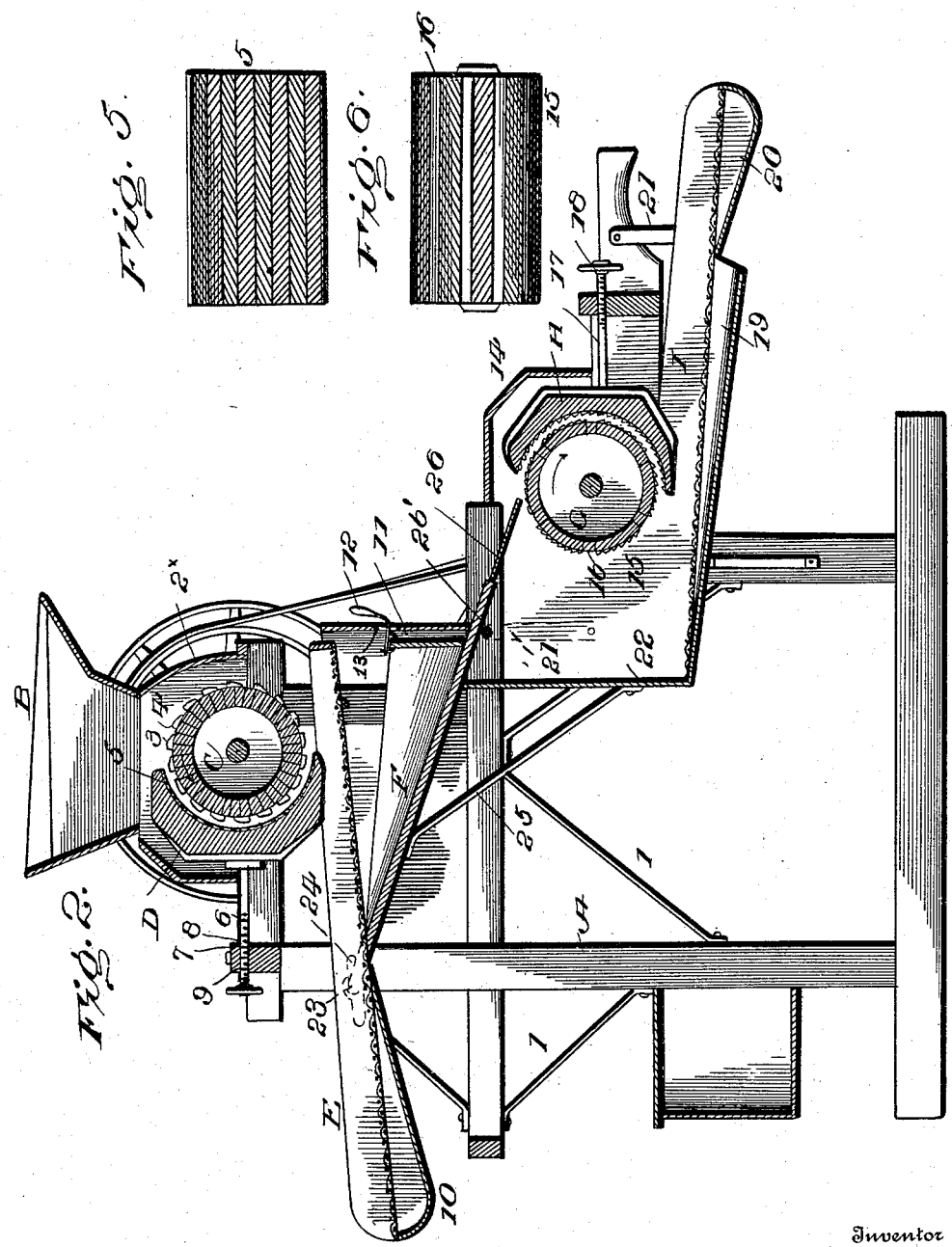
Inventor
David Z. Clay
by Benj. R. Catlin
Attorney
Witnesses

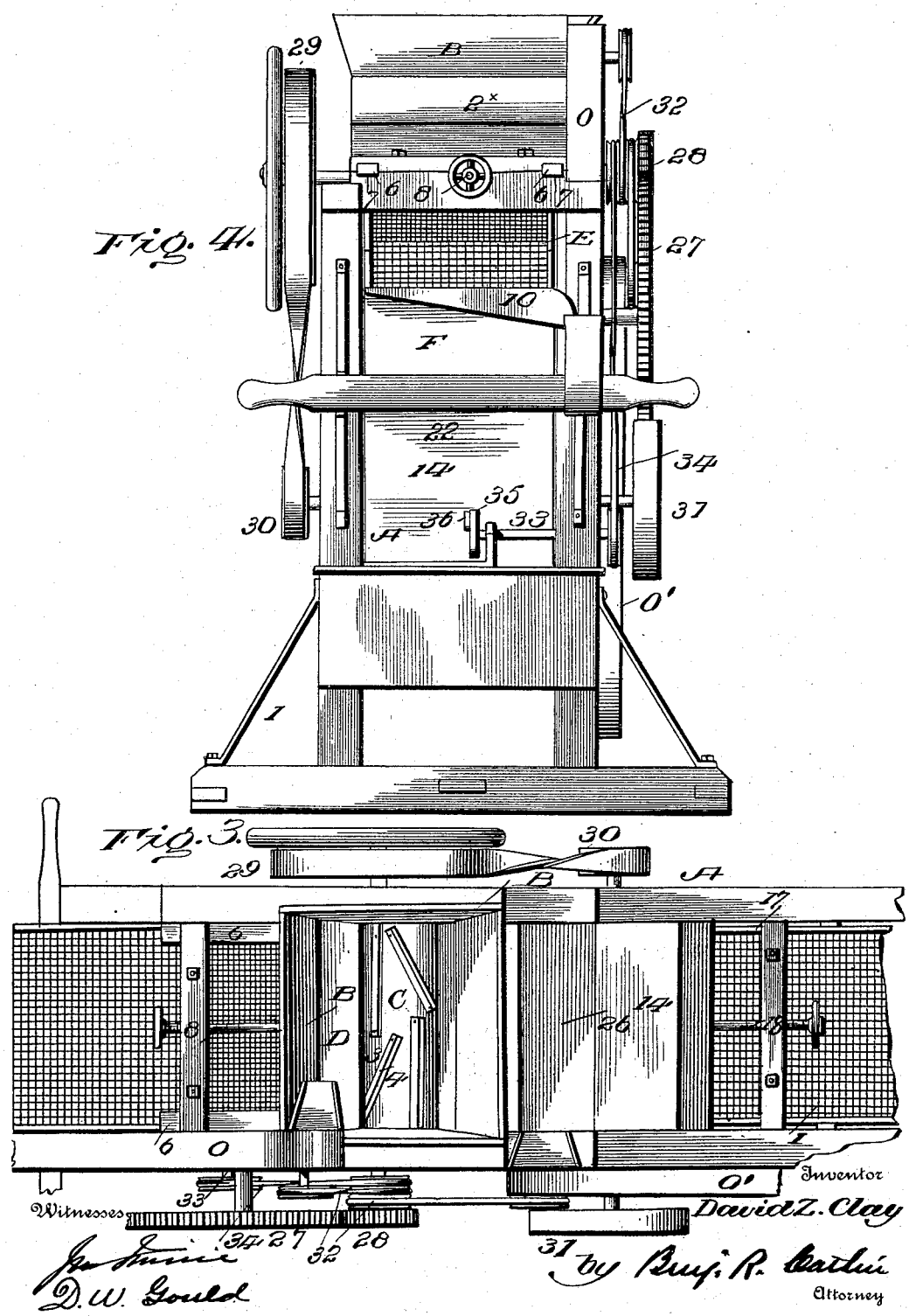

UNITED STATES PATENT OFFICE.

DAVID Z. CLAY, OF EAST HANOVER, PENNSYLVANIA.

FERTILIZER GRINDER AND SEPARATOR.

SPECIFICATION forming part of Letters Patent No. 676,175, dated June 11, 1901.

Application filed August 9, 1898. Serial No. 688,197. (No model.)

*To all whom it may concern:*

Be it known that I, DAVID Z. CLAY, a resident of East Hanover, in the county of Lebanon and State of Pennsylvania, have invented certain new and useful Improvements in Fertilizer Grinders and Separators; and I do hereby declare the following to be a full, clear, and exact description of the invention, such as will enable others skilled in the art to which it pertains to make and use the same.

My invention relates to an improvement in fertilizer grinders and separators.

One object of the invention resides in the peculiar construction of the grinding-cylinders to enable them to more effectively handle the material.

Another object is to so construct the machine that all material not ground to the proper fineness is automatically returned to the grinding-cylinders.

Another object is to simplify the construction and cheapen the cost of manufacture of the machine, so as to adapt it for the individual use of farmers or the like.

Other objects will be apparent from the combination of parts and constructions of details first to be described in connection with the accompanying drawings and then pointed out in the claims.

Figure 1 of the drawings is a side elevation of my improved machine. Fig. 2 is a longitudinal vertical section of the same. Fig. 3 is a plan of the machine. Fig. 4 is a rear elevation of the machine. Fig. 5 is an elevation of one of the movable burs. Fig. 6 is an elevation of the lower grinding-cylinder. Fig. 7 is a perspective view of the feeder for the lower grinding-cylinder.

Referring to the drawings, A represents the framework of the machine, comprising the usual uprights and cross-pieces suitably connected by metallic braces 1.

B is the hopper, suitably secured to the upper portion of the framework, as shown. Directly beneath the hopper I secure a casing $2^\times$ for the upper grinding-cylinder, and within this casing is suitably journaled a grinding-cylinder C. This cylinder comprises a roller on the circumference of which is secured a series of metal strips 3. These strips are arranged in two parallel rows, each strip extending from the end of the cylinder inward past its center, the strips of each row being alternately arranged with respect to those of the other row. Intermediate these parallel strips are arranged rows of strips diagonally situated with regard to the parallel strips, the diagonal strips of one row having an opposite inclination from those of the other row, all as clearly shown in Fig. 3. The strips are formed with a cutting edge at 4, the opposite edge sloping downward and secured to the roller by suitable screws passed through said sloping surface, as clearly shown in the drawings.

The material is fed to and discharged from the grinding-cylinders in a circumferential direction, and the bars or strips 3 have sufficient inclination, as indicated, to direct the material toward the longitudinal center of the cylinder, where they terminate, a space being left for the material to pass by the ends of said strips in a circumferential direction. The overlapping bars parallel to the axis of cylinder C prevent the material passing immediately by the succeeding inclined bar and provide that material passed about the end of the preceding adjacent inclined bar may be spread laterally to a limited extent. The object of this combination of bars is to oppose the tendency of the material to work out toward the ends of the cylinder and at the same time to aid such tendency by the parallel bars sufficiently to prevent clogging at the inner ends of the inclined bars—that is, along approximately central lines of the cylinder circumference.

D represents what I term a "bur," being concave on its inner surface to conform to the shape of the cylinder C and provided on said concave surface with a metal plate 5, formed with a series of diagonal grooves, as shown in Fig. 5. This bur is longitudinally adjustable through horizontal slide-bars 6, which pass through and are supported by openings 7, formed in a portion of the framework. A screw-threaded rod 8, secured to the bur and suitably seated in a screw-threaded bearing 9 in the framework permits the accurate adjustment of the bur with relation to the grinding-cylinder C.

Immediately beneath the cylinder C is supported a sieve E of fine mesh at its inner end and comparatively coarser mesh at its outer end. Beneath the outer end of the sieve I secure a downwardly-sloping chute 10, and beneath the forward end of the sieve I position a downwardly-sloping chute F. The lower end of the chute is provided with a hinge-gate 11, controlled by a latch 12, the handle of which projects through an opening 13 in the frame of the upper grinding-cylinder, as clearly shown in Fig. 2. The latch 12 is weighted, so that when operated to open gate 11 it will by means of its weight maintain said gate in any position in which it may be placed, permitting only the desired quantity of material to pass the gate.

Beneath the lower end of the chute F is secured a casing 14, within which is mounted a second grinding-cylinder G, bearing on its periphery a series of diagonally-grooved metal plates 15, separated from each other by narrow blank strips of wood or metal 16. The concave bur for this cylinder is similar in construction to bur D, having forwardly-extending slides 17 and screw-rod 18 to permit its longitudinal adjustment. The oppositely-inclined grooves in plates 15 act to move the material slightly back and forth lengthwise the cylinder, and the intermediate smooth parts 16 obviate clogging which might follow were the grooves connected at their ends in manner to immediately reverse action on the material passing from the end of one groove to a contiguous one. Beneath this grinding-cylinder G, I secure a second sieve I of fine mesh at its inner end and coarse mesh at its outer end, and beneath the sieve, at its inner end, is a chute 19 to discharge finished material into a receptacle, a chute 20 being located beneath the sieve at its outer end to convey desired material to elevators. The frame carrying the lower sieve is movably swung from the main frame by straps 21, the rear wall 22 of the sieve-frame extending upward and being connected to the chute F, as shown. The inner end of chute F is connected to the sieve-frame E by a knuckle-joint 23, a plate 24 preventing the accidental separation of the parts. A brace 25 connects the rear wall 22 of the lower sieve-frame with the bottom of chute F, and the forward end of said chute is supported on a rounded projection 26', extending from the main frame. The chute F does not extend quite to the grinding-cylinder G and has secured thereto a removable plate 26 of such length as to terminate directly above the grinding-cylinder F. By this construction it will be seen that, if desired, the contents of chute F may by removing plate 26 be directed onto sieve I without passing through the grinding-cylinder G.

27 represents the main gear-wheel, in mesh with the smaller gear-wheel 28, mounted on the shaft on which the grinding-cylinder C is secured. On this shaft, at the opposite end from gear-wheel 28, is mounted a belt-roller 29, from which a cross-belt leads to a roller 30, mounted on the shaft of the lower grinding-cylinder G, and on the opposite end of this shaft is mounted a large belt-wheel 31, to be utilized when driving the machine with power.

O and O' represent, respectively, an upper and lower elevator suitably driven by belts 32, leading from belt-pulleys fixed on the shaft of the upper grinding-cylinder. These elevators serve to receive material from the conveyers 10 and 20 and carry the same upward and discharge it into hopper B and into casing 14 to be reground, as will be fully evident from the drawings.

In the lower part of framework A is journaled a shaft 33, driven by a belt 34, leading from the upper-grinding-cylinder shaft. On the inner end of this shaft 33 is mounted a disk 35, to which is eccentrically pivoted a rod 36, leading forward and pivoted to the rear wall of the lower sieve-frame. By this construction when the machine is being operated a reciprocating motion will be imparted to the two sieve-frames, chutes, and conveyers, causing these parts to effectively perform the service desired.

I have constructed a fertilizer-grinder particularly adapted for the work described. The nature of the material to be ground requires a dress of peculiar construction for the grinding-cylinders in order to effectually grind the soft material without filling the grinding-corrugations, and, furthermore, the duplication of the grinding-cylinders, with their differently-constructed grinding-surfaces, will greatly increase the efficiency of the machine, as the final grinding-cylinder is specially adapted to reduce the material passing the first cylinder, its peculiar grinding-surface readily further reducing the once-ground soft material.

Having thus described my invention, what I claim as new, and desire to secure by Letters Patent, is—

1. In a fertilizer grinder and separator, a grinding-cylinder, a bur adjacent the cylinder and adjustable with relation thereto, said bur having an operative face comprising a series of contiguous rows of diagonally-disposed grooves, said rows being parallel lengthwise the bur and the grooves of each row disposed oppositely to the grooves of the contiguous rows, substantially as described.

2. In a fertilizer grinder and separator, a grinding-cylinder, a bur adjacent the cylinder and adjustable with relation thereto, said bur having an operative face comprising a series of contiguous rows of diagonally-disposed grooves, said rows being parallel lengthwise the bur and the grooves of each row disposed oppositely to the grooves of the contiguous rows, and said cylinder provided with bars arranged to prevent undue spreading of material lengthwise thereof, substantially as described.

3. In a fertilizer grinder and separator, a grinding-cylinder, a bur adjacent the cylinder and adjustable with relation thereto, said bur having an operative face formed of a series of contiguous rows of diagonal grooves, the grooves being alternately inclined in opposite direction with respect to the length of the rows, a screen having fine mesh at one end and coarse mesh at the other located beneath the cylinder, oppositely-inclined chutes beneath the screen and at opposite ends thereof, and means for simultaneously reciprocating the screen and chutes in the operation of the machine.

4. In a fertilizer grinder and separator, a grinding-cylinder provided on its periphery with bars arranged in rows parallel to each other and to the cylinder-axis and alternately overlapping each other at their inner ends, bars arranged between said parallel bars and at an angle thereto, means for feeding material and a discharge-opening each situated midway the cylinder ends, substantially as described.

5. In a fertilizer grinder and separator, a grinding-cylinder provided on its surface with circumferential rows of bars parallel to each other and the cylinder-axis and projecting alternately inward beyond the median line of the cylinder-surface, and circumferential rows of oppositely-inclined bars of equal length and number in each row arranged alternately with the parallel bars, the outer ends of the bars in both rows extending to the proximate end of the cylinder, substantially as described.

6. In a fertilizer grinder and separator, a grinding-cylinder provided on its surface with rows of bars, the bars of each row being arranged alternately parallel and at an inclination to each other, the inclined bars of one row having a differently-directed inclination from the inclined bars of the other row, and each bar extending to the proximate end of the cylinder and means for feeding material midway between the cylinder ends, substantially as described.

7. In combination with a bur, a finishing grinding-cylinder comprising series of rows of grooves, said grooves being oppositely inclined and the adjacent rows separated by plain faces.

In testimony whereof I have signed this specification in the presence of two subscribing witnesses.

DAVID Z. CLAY.

Witnesses:
   AUGUSTUS FASNACHT,
   AMOS D. CLAY.